Inventor
SAMUEL GREISMAN

By
Brady, O'Boyle & Gates
Attorneys

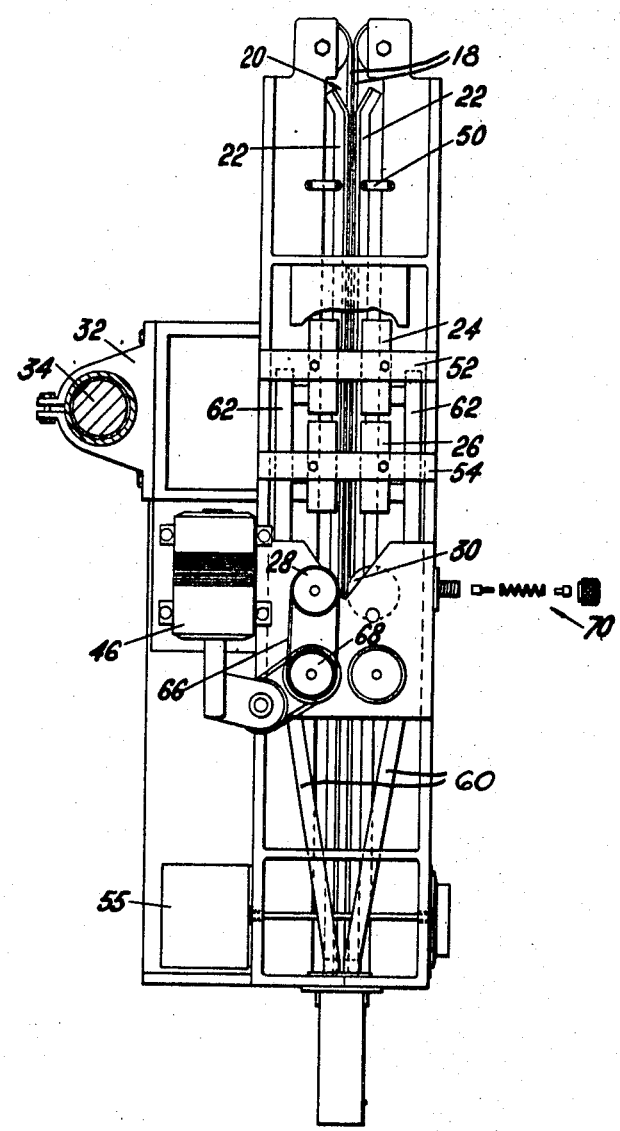

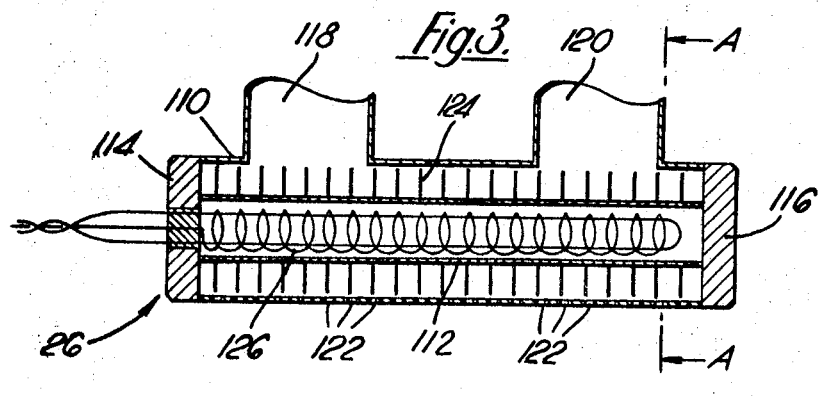
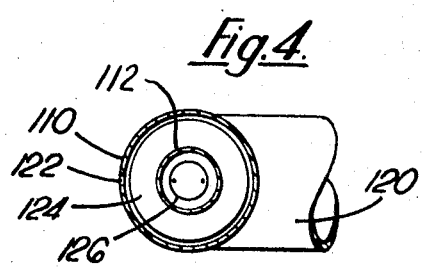
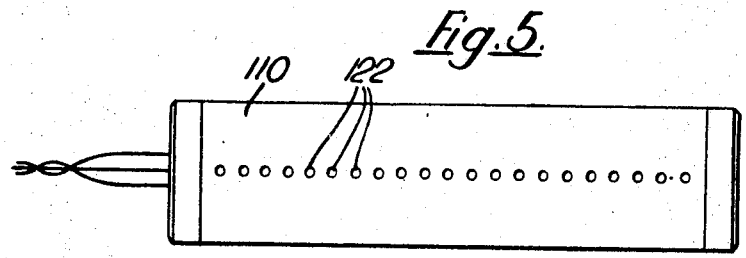
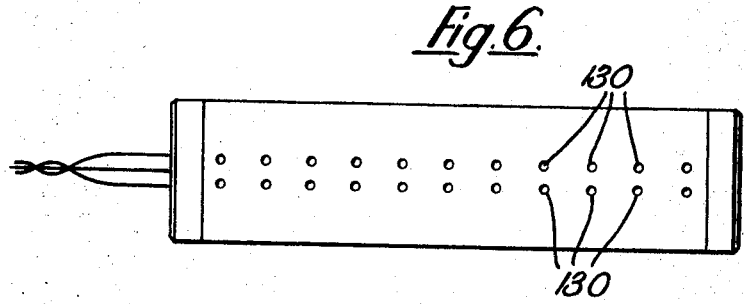

April 27, 1971 S. GREISMAN 3,576,694
METHOD OF, AND APPARATUS FOR FORMING A LINEAR SEAL
BETWEEN TWO LAYERS OF A THERMOPLASTIC MATERIAL
Filed Oct. 23, 1967 4 Sheets-Sheet 4

Inventor
SAMUEL GREISMAN
By
Brady, O'Boyle & Gates
Attorneys

United States Patent Office 3,576,694
Patented Apr. 27, 1971

3,576,694
METHOD OF, AND APPARATUS FOR FORMING A LINEAR SEAL BETWEEN TWO LAYERS OF A THERMOPLASTIC MATERIAL
Samuel Greisman, London, England, assignor to Contex Limited, London, England
Filed Oct. 23, 1967, Ser. No. 677,273
Claims priority, application Great Britain, Oct. 25, 1966, 47,913, 47,914
Int. Cl. B32b 31/00
U.S. Cl. 156—498    7 Claims

ABSTRACT OF THE DISCLOSURE

A method of forming a linear seal between two layers of a thermoplastic or thermoplastic-coated material, comprises gripping the layers in juxtaposed condition and progressing same in such condition with the grip extending linearly as progress is effected to provide a gripped section and intercepting the path of progress successively by directing a plurality of jets of hot air from both sides of the juxtaposed layers.

---

The present invention relates to a method of and apparatus for forming a linear seal between two layers of a thermoplastic material such as polythene or polyvinylchloride, or a thermoplastic-coated material.

In accordance with the present invention, a method of forming a linear seal between two layers of a thermoplastic or thermoplastic-coated material, comprises gripping the layers in juxtaposed condition and progressing same in such condition with the grip extending linearly as progress is effected to provide a gripped section, intercepting the path of progress successively by directing a plurality of jets of hot air from both sides of the juxtaposed layers simultaneously onto a non-gripped linear section parallel to the gripped section to raise the temperature of both said layers in said non-gripped section to near the melting point of the material, and by pressing the two layers together along said non-gripped linear section to seal same together.

Further, in accordance with the present invention, apparatus for forming a linear seal between two layers of a thermoplastic or thermoplastic-coated material comprises means for gripping the layers in juxtaposed condition and progressing same in such condition with the grip extending linearly as progress is effected to provide a gripped section, the path of progress being intercepted successively by means for directing hot air from both sides of the juxtaposed layers simultaneously onto a non-gripped linear section parallel to the gripped section to raise the temperature of both said layers in said non-gripped section to near the melting point of the material, and means uniting the two layers throughout said non-gripped linear section to seal same together.

Further features of the present invention will appear from the following description thereof, which is given by way of example and not limitation, with reference to the accompanying drawings, in which:

FIG. 2 is a plan view of the apparatus of FIG. 1;

FIG. 3 is a longitudinal axial section through a heater block forming part of the apparatus of FIGS. 1 and 2;

FIG. 4 is a section on the line A—A of FIG. 3 in the direction of the arrows;

FIG. 5 is a side elevation of the heater block of FIG. 3;

FIG. 6 is a side elevation of a modified heater block; and

Figure 1:
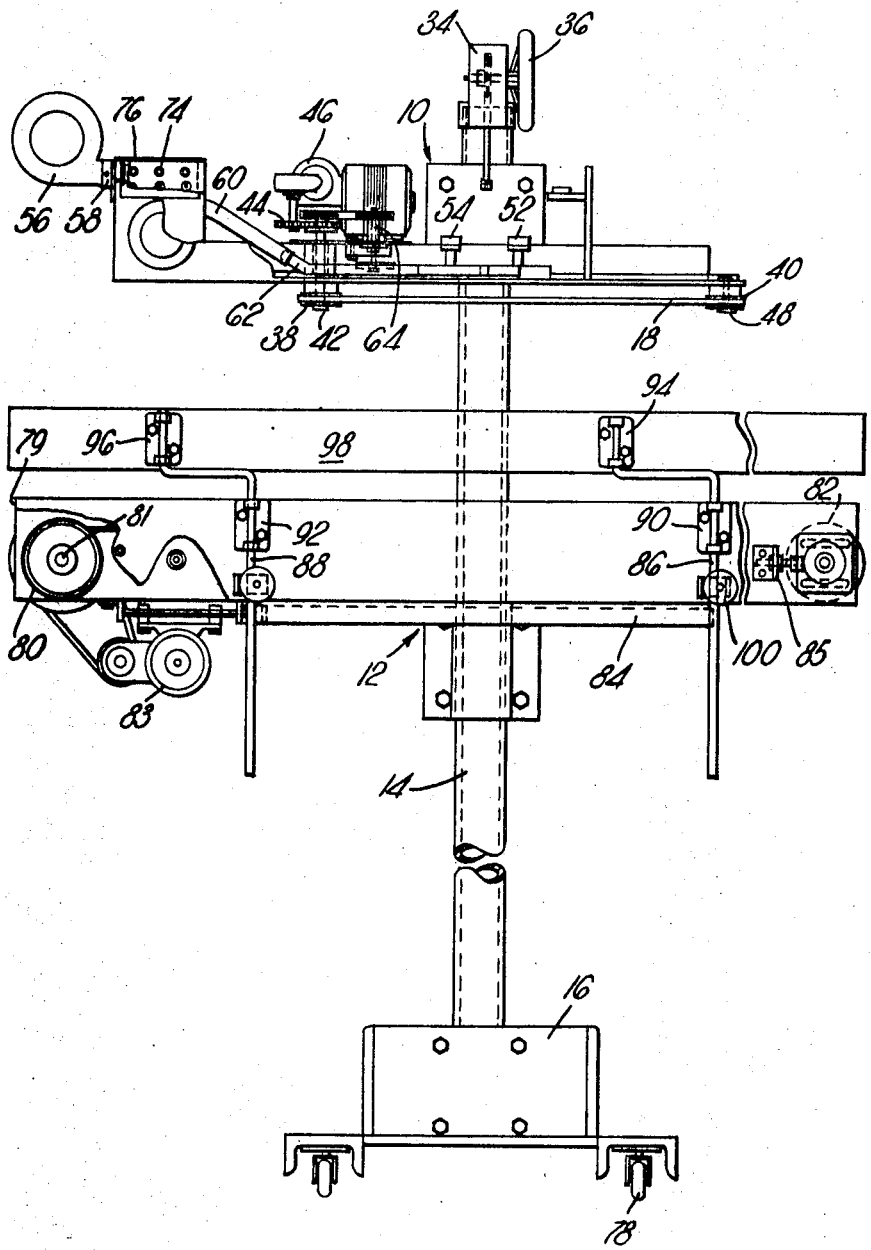
FIG. 1 is a side elevation of apparatus according to the invention.

Referring to the drawings, FIG. 1 shows a heat-sealing unit 10 and a conveyor unit 12. The conveyor unit 12 is mounted on a main upright 14 supported on a wheeled base 16, and the heat-sealing unit 10 is slidably mounted for up-and-down movement on the main upright above the conveyor unit and parallel with the same.

The heat-sealing unit 10 includes two endless guide belts 18, and the height of the unit above the conveyor unit is such that when a filled bag (not shown) is placed on the belt (not shown) of the conveyor (which belt travels from right to left in the apparatus as shown in FIG. 1) the mouth of the bag enters a bag-entry 20 (see FIG. 2) between two stationary guides 22 and the belts hold the mouth of the bag closed below the level at which the seal is to be formed.

The bags are supported and progressed by the conveyor belt and the upper ends of the bags are progressed by the synchronously-driven carrier belts so that a linear section of the bag in which the seal is to be formed passes successively between two pairs of heater blocks 24 and 26 of similar construction which are disposed parallel to and spaced on either side of the path of travel of the bags. The section of the bag to be sealed is brought to a temperature just below the melting point of the thermoplastic material by air heated in the heater blocks and blown onto the bag. The first pair of blocks 24 are preheater blocks and are used if the material of the bag is relatively thick. For thin, polythene sheets, for example, the heater blocks 26 only are required. Downstream of the heater blocks are a pair of pinch rollers 28 and 30, roller 28 being driven and roller 30 being idle. The section of the bag in which the seal is to be formed is passed between the rollers to form the seal. The surface of one roller is knurled and the surface of the other roller is smooth. However, both rollers may have a knurled surface if desired.

In a modification of apparatus according to the invention a pair of cooling blocks may be arranged downstream of the pinch rollers and parallel to the path of the bag to cool the sealed section. The construction of the cooling blocks is similar to that of the heater blocks but they are cooled instead of heated. Also a knife edge (not shown) may be provided downstream of the cooling blocks to cut off surplus material above the seal.

The speed with which the bags are progressed through the apparatus can be varied according to the material of the bag but a speed of 30 ft./sec. is preferred. The temperatures of the heater blocks and the preheater blocks are thermostatically controlled and adjusted according to the material of the bag.

The heal-sealing unit is slidably mounted on the main upright 14 by means of a bracket 32, and a counterweight 34 is provided together with a counterweight wheel 36.

The carrier belts (or chains) 18 are disposed in parallel relationship around driving sprockets 38 and take-up sprockets 40. The driving sprockets are mounted on shafts 42 which are driven by gears 44 from a motor 46. The take-up sprockets 40 are mounted on shafts 48 situated near the bag-entry 20. The stationary guides 22 are supported at 50 (see FIG. 2).

The two pairs of elongate electric heater blocks 24 and 26, which are described in greater detail below are mounted at 52 and 54, respectively, on the unit in such a way that there is no contact with the bag as it passes between the blocks of each pair. The temperature of the blocks can be adjusted by means of a rheostat 55.

A blower 56 is mounted on the unit by means of a mounting bracket 58 and is connected by means of two pipes 60 of plastics material to air manifolds 62 through which air is led to the heater blocks. The air passes through the transverse channels and is heated therein and then, if a bag is between the heater blocks, the heated air impinges onto that section of the bag in which the seal is to be formed.

Downstream of the heater blocks the pinch rollers 28 and 30 are mounted at 64, and the roller 28 is driven by the motor 46 by means of a chain 66. The tension of the driven pinch roller 28 can be adjusted at 68 and the position of the rollers can be adjusted at 70.

The control panel incorporating a safety light 74 is situated at 76.

The conveyor unit 12 mounted on the main upright 14, which is in turn mounted on the base 16 having wheels 78, includes the endless conveyor belt mounted on a belt table 79 and disposed around a main driven roller 80 which is mounted on a shaft 81 and driven by a motor 83, and a take-up roller 82 mounted on a bracket 85. The belt table has a support 84. Two pairs of cranks 86 and 88 are mounted on either side of the belt table by means of mounting brackets 90 and 92, respectively.

The cranks are mounted by means of brackets 94 and 96 on parallel support boards 98 (only one shown), and are adjustable by means of handles 100 so that the boards, which support the sides of the bags, can be moved in a direction perpendicular to themselves for different sizes of bag on the conveyor.

As shown in FIGS. 3 through 6, each of the heater units 26, which are similar to the heater units 24, comprises two cylindrical tubes 110 and 112 of mild steel mounted co-axially in collars 114 and 116 which close the ends of the tubes. The outer tube 110 has two air-inlet conduits 118 and 120 and diametrically opposed thereto, a plurality of longitudinally-arranged small bore air-outlet holes 122.

The inner tube 112 has mounted thereupon radial fins 124 which extend up to 1/16" from the inside surface of the outer tube 110. Inside this tube is mounted a heater element 126 of 1½ to 2 kilowatts.

In operation, the air is blown through the inlet conduits 118 and 120 into the annular space between the two tubes. The air is heated by contact with the surface of the inner tube 112 and the fins 124 as it passes through transverse passages in the heater unit defined by the fins 124, and passes out of the small holes 122. As the holes are small relative to the bore of the inlet conduits 118 and 120 the air issues therefrom under pressure.

The heater block shown in FIG. 6 is similar to that of FIGS. 3 to 5 except that the single row of holes 122 is replaced by two parallel rows of air-outlet holes 130.

Figure 7:
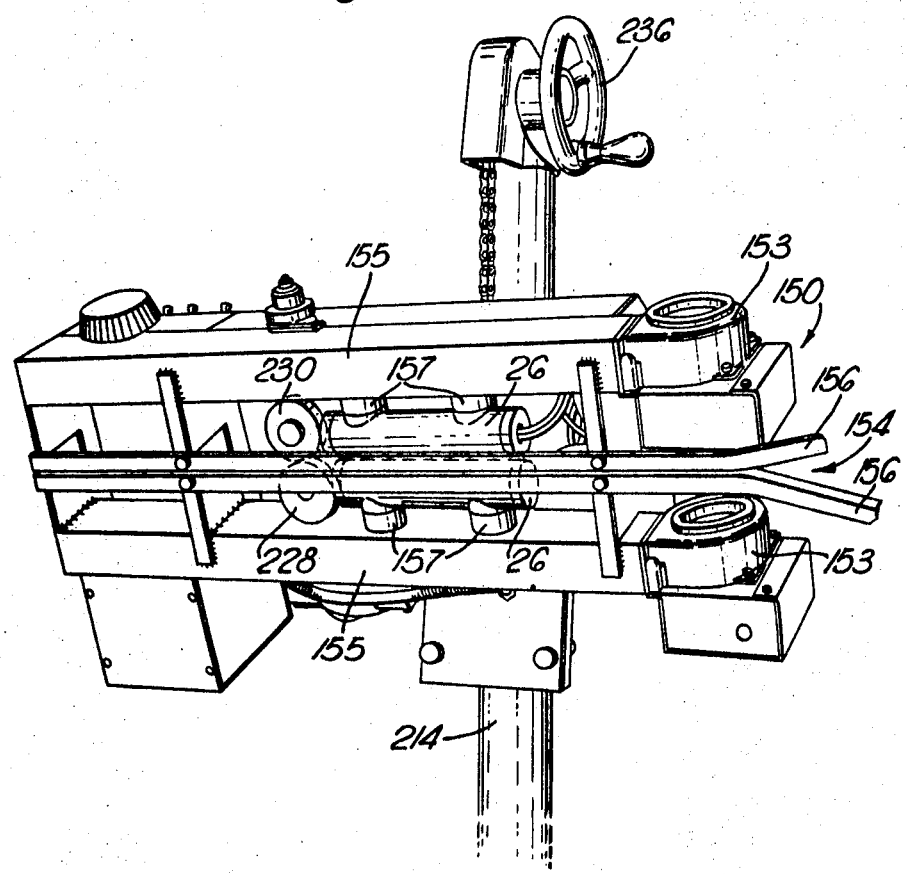
FIG. 7 shows a perspective view of a modification of the apparatus shown in FIG. 1 to 5.

In the modification of the apparatus illustrated in FIG. 7, heat sealing unit indicated generally by reference numeral 150 is shown pivoted upwardly relative to an upright support to show various parts of the heat sealing unit 150. A pair of blowers 153 are mounted adjacent a bag entry 154 between two stationary guides 156, the blowers communicating with hollow ducts 155.

The ducts 155, which are of rectangular cross-section, are mounted substantially parallel to the carrier belts and are spaced on either side thereof to extend from the blowers 153 to the opposite end of the heat sealing unit 150, at which the ducts 155 are closed. Two of the heater units 26 are disposed between the ducts 155 and communicate with the ducts 155 through cylindrical ducts 157 for throughflow of air from the blowers 153 through the heater units 26. Other parts of the apparatus of FIG. 7 which are the same as those of the apparatus of FIGS. 1 and 2 have been indicated by corresponding reference numerals increased by 200, these parts including a main upright 214 on which the conveyor unit 12 shown in FIG. 1 is mounted, pinch rollers 228 and 230, and a counter-weight wheel 236. The operation of the modified apparatus is similar to that of FIGS. 1 and 2 and it therefore not described in further detail.

The invention may, as indicated above, be applied to any suitable materials comprising a thermoplastic layer, e.g. to polythene-coated paper sack and cellulose film bags.

I claim:

1. Apparatus for forming a linear seal between two layers of a thermoplastic or thermoplastic-coated material, comprising means for gripping said layers in juxtaposed condition and progressing said layers along a path in said juxtaposed condition with the grip extending linearly as progress is effected to provide a gripped section, elongate heater blocks disposed on opposite sides of said path and extending adjacent an parallel to said paths, electric heater elements extending longitudinally of the interiors of said heater blocks, means defining a plurality of air outlet openings spaced along the side of each of said heater blocks facing said path, means for flowing air over said elements and through said air outlet openings onto a non-gripped linear section parallel to said gripped section to raise the temperature of both said layers in said non-gripped section to near the melting point of the material, and means for uniting said layers throughout said non-gripped linear section to seal same together.

2. Apparatus as set forth in claim 1, wherein each of said heater blocks further comprises a plurality of heat exchange fins extending around the electric heater element thereof and dividing the interior thereof into a plurality of transverse passages for the air.

3. Apparatus as set forth in claim 1, wherein said air flowing means comprise a blower mounted on said apparatus.

4. Apparatus for sealing filled bags of thermoplastic or thermoplastic-coated material, comprising means for supporting and conveying the bags, two endless belts or chains for gripping each bag in a manner to hold the mouth thereof closed or flat and below the level at which the seal is to be formed, a pair of heater blocks disposed parallel to and spaced on either side of the path of the bags, said heater blocks each comprising an elongate housing, an electric heater element extending longitudinally of the interior of said housing, and means defining a plurality of heated air discharge openings spaced along the side of said housing facing the path of the bags, means for driving said belts or chains in synchronism with movement of said bag-supporting and conveying means to progress the bags successively between said heater blocks, means defining transverse passages in said heater blocks, means for flowing air through the transverse passages in said heater blocks thereby to heat the air prior to discharging it through said heated air discharge openings onto the part of each bag to be sealed to raise the temperature of that part up to a temperature near to the melting point of the thermoplastic material, and a pair of rollers for sealing said heated bag part.

5. Apparatus as set forth in claim 4, wherein said supporting and conveying means include a pair of supporting members mounted parallel to and on either side of said supporting and conveying means at an adjustable height above same, and means for adjusting each of said supporting members in a direction perpendicular to itself for adapting said supporting and conveying means to filled bags of different sizes.

6. Apparatus as set forth in claim 4, wherein each of said one pair of heater blocks comprises an inner tube containing said electric heater element, said elongate housing comprising an outer tube coaxial with said inner tube, means closing said inner and outer tubes at both ends thereof, and means defining an air inlet at the side of said outer tube opposite the side in which said heated air discharge openings are formed.

7. Apparatus as set forth in claim 6, wherein said passage defining means comprise a plurality of radial fins on the external surface of said inner tube.

References Cited

UNITED STATES PATENTS

| | | | |
|---|---|---|---|
| 2,997,098 | 8/1961 | Diese et al. | 156—497 |
| 3,047,051 | 7/1962 | Matveeff | 156—583X |
| 3,278,358 | 10/1966 | Rosewicz et al. | 156—497X |
| 3,340,678 | 9/1967 | Rhodes | 156—497X |
| 3,416,411 | 12/1968 | Hittenberger et al. | 156—497X |

ROBERT F. STAHL, Primary Examiner

U.S. Cl. X.R.

156—583